United States Patent Office 2,974,166
Patented Mar. 7, 1961

2,974,166

CERTAIN 1-ARYLSULFONYL-3-(CIS-2-DECALYL)UREAS

John Alfred Aeschlimann, Montclair, and Arthur Stempel, Teaneck, N.J., assignors to Hoffmann-La Roche Inc., Nutley, N.J., a corporation of New Jersey No Drawing. Filed Sept. 15, 1959, Ser. No. 840,014

8 Claims. (Cl. 260—553)

This invention relates to novel chemical compounds and to novel methods for their production. More particularly, it relates to compounds represented by the general formula

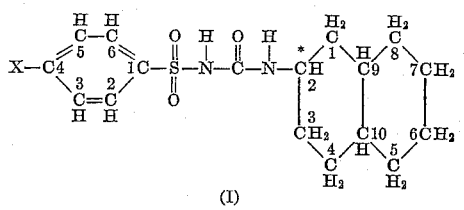

(I)

wherein the symbol X represents a member selected from the group consisting of hydrogen, the methyl radical and a middle halogen (i.e. chlorine or bromine), and wherein also the hydrogen atoms attached to the two carbon atoms at the ring junction (in the 2-decahydronaphthyl radical shown, i.e. the carbon atoms numbered 9 and 10 therein) are in "cis" relationship to each other. For purposes of brevity, the designation "2-decahydronaphthyl" is hereinafter rendered in an accepted abbreviated form as "2-decalyl."

As an aid to comprehension of nomenclatures employed herein, nuclear carbon atoms in the above formula have been numbered, and an asymmetric carbon atom therein is indicated by an asterisk.

In one of its embodiments, the present invention provides a general process for making compounds represented by the above general Formula I which comprises reacting a cis-2-decalylamine with phenylsulfonylurea or p-tolylsulfonylurea or p-chlorophenylsulfonylurea or p-bromophenylsulfonylurea. (It should be understood that the designation "cis" in the nomenclature "cis-2-decalyl" refers to the configuration relative to each other of the hydrogen atoms attached to the 9- and 10-carbon atoms, respectively, in the decalyl radical.)

In another of its embodiments, the invention provides an alternative general process for making compounds represented by the above general Formula I which comprises reacting a cis-2-decalylamine with phenylsulfonylisocyanate or p-tolylsulfonylisocyanate or p-chlorophenylsulfonylisocyanate or p-bromophenylsulfonylisocyanate.

The reactants required for the practice of the above described general processes are known materials. In particular, cis-cis-2-decalylamine (M.P. of benzamide, 128° C.) and cis-trans-2-decalylamine (M.P. of benzamide, 204° C.) have been described by Dauben et al.: J. Am. Chem. Soc. 73, 1504–1508 (1951), and ibid. 76, 4420–4426 (1954). (The nomenclatures "cis-cis-2-decalyl" and "cis-trans-2-decalyl" are employed herein in the same sense in which they are used by Dauben et al.) Dauben et al. also disclose isomeric mixtures, herein designated "cis-{cis+trans}-2-decalylamine," i.e. mixtures of the isomers cis-cis-2-decalylamine and cis-trans-2-decalylamine; isomeric mixtures designated cis-{cis+trans}-2-decalylamine are also useful as reactants in the above described general processes.

The compounds of general Formula I and their pharmaceutical equivalents (e.g. salts of said compounds of Formula I with conventional pharmaceutically acceptable inorganic and organic bases, e.g. sodium-, potassium- and ammonium hydroxide, diethanolamine, triethanolamine, and the like) are useful as hypoglycemic agents. In particular, the compounds of general Formula I are useful, upon oral administration, for the purpose of lowering the blood sugar level. The novel compounds of this invention can be employed generally in the same manner as known hypoglycemic agents, of the type of tolbutamide and similar substituted sulfonylureas.

Preliminary pharmacological trials in rats suggest that hypoglycemic activity of compounds of the invention is not conditioned upon optical activity thereof. Thus, in such trials of one of the preferred species of the invention, viz. 1-p-tolylsulfonyl-3-(cis-trans-2-decalyl)urea, it has been found that the racemic form, the dextrorotatory form and the levorotatory form all possess the same order of hypoglycemic activity. On the other hand, preliminary pharmacological trials suggest that hypoglycemic activity may be conditioned upon the geometric disposition in respect of "cis-trans" isomerism. Thus, 1-p-tolylsulfonyl-3-(cis-trans-2-decalyl)urea and isomeric mixtures containing the same, i.e. 1-p-tolylsulfonyl-3-(cis-{cis+trans}- 2-decalyl)urea, have been found in preliminary tests on rats to be appreciably more active as hypoglycemic agents than 1-p-tolylsulfonyl-3-(cis-cis-2-decalyl)urea.

This application is a continuation-in-part of our prior copending application Serial No. 812,833, filed May 13, 1959, now abandoned.

The invention is further disclosed in the following examples, which are illustrative but not limitative thereof. All temperatures are in degrees centigrade, uncorrected.

Example 1

A suspension of 67.1 g. of p-tolylsulfonylurea and 48.0 g. of racemic cis-trans-2-decalylamine (Dauben et al., loc. cit.) in 1800 cc. of chlorobenzene was stirred and heated to reflux for one hour. At the reflux temperature, ammonia was evolved rapidly and all the material went into solution. The reaction mixture was cooled and concentrated to about half the original volume by distillation in vacuo. To the residual solution, 1900 cc. of hexane was added and on scratching crude product began to crystallize. After chilling overnight in the refrigerator, the product was filtered and dried in a vacuum oven at 55°—yield 100.5 g.; M.P. 159–166.5°. Recrystallization from a mixture of 1500 cc. of ethanol and 1400 cc. of water gave 76.8 g. of 1-p-tolylsulfonyl-3-(dl-cis-trans-2-decalyl)urea; M.P. 176.5–178.5°. A second recrystallization from a mixture of 1100 cc. of ethanol and 950 cc. of water raised the melting point to 178–180°; yield—68.5 g., 62% of theory.

Analysis.—Calc'd. for $C_{18}H_{26}N_2O_3S$: C, 61.68; H, 7.48; N, 7.99. Found: C, 62.22, 61.78; H, 7.55, 7.41; N, 8.07.

Example 2

To a solution of 3.2 g. of racemic cis-trans-2-declaylamine in 50 cc. of benzene, 4.1 g. of p-tolylsulfonylisocyanate was added. After standing overnight at room temperature, the solvent was removed in vacuo and the residue was crystallized from acetonitrile to give 5.5 g. of 1-p-tolylsulfonyl-3-(dl-cis-trans-2-decalyl)urea; M.P. 158–163°. Further recrystallization from acetonitrile (alternatively, aqueous ethanol can be used) raised the melting point to 178–180°.

Example 3

A solution of 10.4 g. of p-tolylsulfonylisocyanate and 7.8 g. of cis-{cis+trans}-2-decalylamine (mixture of racemic cis-cis and racemic cis-trans isomers [Dauben et al., loc. cit.]) in 250 cc. of benzene was allowed to stand at room temperature overnight, and then the reaction mixture was taken to dryness in vacuo. The residue was dissolved in 1500 cc. of dilute ammonia and filtered to remove insolubles. Upon neutralization of the filtrate with concentrated hydrochloric acid, a partially crystalline product separated. This was filtered off, dried, and recrystallized from aqueous acetonitrile, yielding 7.3 g. of a product having M.P. 154–166°. The latter product was recrystallized from aqueous alcohol, yielding 6.9 g. of a material having M.P. 154–167°. For purposes of effecting separation, the latter material was dissolved in 60 cc. of ethyl acetate and hexane was added to turbidity. The mixture was chilled, yielding 3.4 g. of a crystalline precipitate which was filtered off. The filtrate was taken to dryness in vacuo and the residue was recrystallized from aqueous ethanol, yielding 2.9 g. of 1-p-tolylsulfonyl-3-(dl-cis-{cis+trans}-2-decalyl)urea, M.P. 149–154°.

*Analysis.*—Calc'd. for $C_{18}H_{26}N_2O_3S$: C, 61.68; H, 7.48; N, 7.99. Found: C, 62.12, 62.65; H, 6.92, 7.21; N, 8.08.

Example 4

A suspension of 14.7 g. of p-chlorobenzenesulfonylurea and 9.7 g. of racemic cis-trans-2-decalylamine in 400 cc. of chlorobenzene was heated to reflux for one hour. Ammonia was evolved at the reflux temperature and all the material went into solution. After removal of solvent by distillation in vacuo, the residue was recrystallized from acetonitrile to give 18.4 g. of 1-p-chlorophenylsulfonyl - 3 - (dl-cis-trans-2-decalyl)urea, M.P. 177–178.5°. On further crystallization from acetonitrile, the melting point was 178–180°, yield—15.6 g.

*Analysis.*—Calc'd. for $C_{17}H_{23}N_2O_3SCl$: C, 55.05; H, 6.25; N, 7.45. Found: C, 55.58; H, 6.13; N, 7.36, 7.66.

Example 5

To a solution of 4.7 g. of cis-{cis+trans}-2-decalylamine (mixture of racemic cis-cis- and racemic cis-trans isomers) in 200 cc. of benzene, 6.6 g. of p-chlorophenylsulfonylisocyanate was added. After standing overnight at room temperature, the solvent was removed in vacuo, and the residue crystallized from acetonitrile. The product, 1-p-chlorophenylsulfonyl-3-(dl-cis-{cis+trans}-2-decalyl)urea, melted at 147–151°, yield—7.5 g. Two recrystallizations from a mixture of ethyl acetate and hexane did not alter the melting point.

*Analysis.*—Calc'd. for $C_{17}H_{23}N_2O_3SCl$: C, 55.05; H, 6.25; N, 7.45. Found: C, 55.13; H, 6.10; N, 7.76.

Example 6

To a solution of 97 g. of racemic cis-trans-2-decalylamine in 600 cc. of ethanol, 150 g. of d-camphorsulfonic acid was added. The solvent was evaporated in vacuo and the residue was then dissolved in 1500 cc. of warm water. On standing at room temperature, crystals formed. The crystals (A) were filtered off and the aqueous filtrate (B) retained and worked up as described below.

The crystalline fraction (A) [yield—102 g., $[\alpha_D]^{24}=+33.0°$ (ethanol)] was recrystallized from 800 cc. of water to give 78.5 g. of camphorsulfonate salt $[\alpha_D]^{23}=+33.7°$ (ethanol). Recrystallization from acetonitrile yielded 72.1 g. of salt, $[\alpha_D]^{22}=+34.3°$ (ethanol). The salt was dissolved in water and the free amine was liberated with an excess of 40% sodium hydroxide. The amine was extracted with benzene, the benzene layer was dried over sodium sulfate, and solvent was then evaporated in vacuo. The residue was dissolved in ether, and anhydrous hydrogen chloride was bubbled in to give the amine hydrochloride; yield—31.5 g., $[\alpha_D]^{23}=+16.6°$ ($H_2O$). Recrystallization from a mixture of ethanol and ether yielded 21.2 g. of d-cis-trans-2-decalylamine hydrochloride $[\alpha_D]^{24}=+15.8°$ ($H_2O$), agreeing well with the value $[\alpha_D]^{20.5}=+15.49°$ reported by Hückel et al., Ber. deut. chem. Ges., 70, 2482 (1937).

The aqueous filtrate (B) was concentrated to about 500 cc. in vacuo. A crystalline fraction separated, yield—122 g., $[\alpha_D]^{22}=+20.47$ (ethanol). Further recrystallization of the dextrorotatory champhorsulfonate from water did not alter the rotation. The salt was dissolved in water and the solution made strongly alkaline by the addition of 40% sodium hydroxide. The liberated amine was extracted with benzene, the benzene layer was dried over sodium sulfate, and the solvent was then evaporated in vacuo. The residue, 46 g., was dissolved in ethanol and converted to the hydrochloride by addition of an excess of alcoholic hydrogen chloride. The solvent was evaporated in vacuo and the residue was recrystallized from aqueous acetonitrile to give 26.6 g. of hydrochloride, $[\alpha_D]^{23}=-14.0$ ($H_2O$). Two more crystallizations from aqueous acetonitrile gave 6.8 g. of l-cis-trans-2-decalylamine hydrochloride of constant rotation, $[\alpha_D]^{24}=-16.0$ ($H_2O$), agreeing well with the value $[\alpha_D]^{20.5}=-15.53°$ reported by Hückel et al., Ber. deut. chem. Ges. 70, 2482 (1937).

The free base was liberated from 6.8 g. of l-cis-trans-2-decalylamine hydrochloride ($[\alpha_D]^{23}=-16.0$ [$H_2O$]) by the addition of 40% sodium hydroxide to an aqueous solution of the hydrochloride. Extraction with benzene followed by drying over sodium sulfate and evaporation of the solvent in vacuo gave 5.0 g. of the base. The latter was dissolved in 100 cc. of benzene and 6.3 g. of p-tolylsulfonylisocyanate was added. The reaction mixture was concentrated to dryness after standing overnight at room temperature. Crystallization of the residue from acetonitrile gave 8.6 g. of levorotatory 1-p-tolylsulfonyl-3-(cis-trans-2-decalyl)urea, M.P. 143–148°. Three further recrystallizations from acetonitrile gave 5.3 g. of (1-(p-tolylsulfonyl)-3-(l-cis-trans-2-decalyl) urea, M.P. 150.5–152.5°, $[\alpha_D]^{23}=-4.64$ in pyridine.

*Analysis.*—Calc'd. for $C_{18}H_{26}N_2O_3S$: C, 61.68; H, 7.48. Found: C, 61.51; H, 7.20.

Example 7

An aqueous solution of 21.2 g. of d-cis-trans-2-decalylamine hydrochloride $[\alpha_D^{24}=+15.8$ ($H_2O$)], from Example 6, was made strongly alkaline with 40% sodium hydroxide and the liberated base was extracted with benzene. The benzene extract was dried over sodium sulfate and the solvent was removed by distillation in vacuo, to give 16.5 g. of d-cis-trans-2-decalylamine. The amine was dissolved in 500 cc. of benzene and 21.2 g. of p-tolylsulfonylisocyanate were added. After one hour at room temperature, the solvent was removed by distillation in vacuo. The residue was crystallized from acetonitrile, yielding 28.7 g. of dextrorotatory 1-p-tolylsulfonyl-3-(cis-trans-2-decalyl)urea, M.P. 147–154°. Following five crystallizations from acetonitrile, the product gave a constant melting point of 151–153° and a constant rotation of $\alpha_D^{23}=+4.84$ (pyridine).

*Analysis.*—Calc'd. for $C_{18}H_{26}N_2O_3S$: C, 61.68; H, 7.48. Found: C, 61.41; H, 7.40.

A mixture of 100 mg. of the last mentioned highly purified 1-(p-tolylsulfonyl)-3-(d-cis-trans-2-decalyl)urea and 100 mg. of the highly purified 1-(p-tolylsulfonyl)-3-(l-cis-trans-2-decalyl)urea from Example 6 was crystallized from aqueous ethanol to give racemic 1-p-tolysulfonyl-3-(cis-trans-2-decalyl)urea, M.P. 179–180.5°. A mixed melting point determination, carried out upon a mixture of the last mentioned racemic product and the racemic product from Example 1, showed no melting point depression.

Example 8

Racemic cis-cis-2-decalylamine (Dauben et al., loc. cit.), 1.3 g. was dissolved in 50 cc. of benzene and 1.6 g. of p-tolyl-sulfonylisocyanate were added. The reaction mixture was allowed to stand two hours at room temperature and was then evaporated to dryness in vacuo. The residue was crystallized from acetonitrile, yielding 1.6 g. of 1-p-tolylsulfonyl-3-(*dl*-cis-cis-2-decalyl)urea, M.P. 180–182°.

Example 9

7.8 g. of a mixture of racemic cis-cis- and racemic cis-trans-2-decalylamine was dissolved in 250 cc. of benzene and 10 g. of p-tolylsulfonylisocyanate were added. After the reaction mixture stood for three days at room temperature, the solvent was evaporated in vacuo. The residue was dissolved in dilute ammonia and filtered through "Hyflo" (a filter aid) to remove turbidity. Acidification of the filtrate with dilute hydrochloric acid yielded a partially crystalline product. On recrystallization from aqueous acetonitrile, 7.3 g. of a product melting at 154–166° was obtained. Several recrystallizations of the latter product from acetonitrile yielded 2.5 g. of 1-p-tolylsulfonyl-3-(*dl*-cis-cis-2-decalyl)urea, M.P. 182–183.5°. A mixed melting point determination, carried out upon a mixture of the latter material with the product of Example 8 above, showed no melting point depression.

Example 10

A solution of 6.0 g. of racemic cis-trans-2-decalylamine hydrochloride in water was made strongly basic with 40% sodium hydroxide and the liberated amine was extracted with benzene. After drying the benzene layer over sodium sulfate, the solvent was evaporated in vacuo and the residue was dissolved in 150 cc. of benzene. After addition of 5.8 g. of phenylsulfonylisocyanate, the reaction mixture was kept at room temperature overnight, and then taken to dryness in vacuo. The residue was crystallized from aqueous acetonitrile to yield 9.1 g. of 1-phenylsulfonyl-3-(*dl*-cis-trans-2-decalyl)urea; M.P. 156.5–159°. Further crystallization from acetonitrile did not alter the melting point.

We claim:

1. A compound represented by the formula

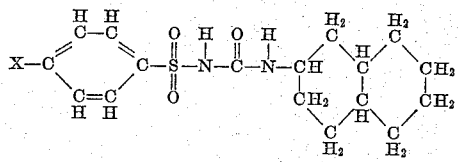

wherein X represents a member selected from the group consisting of hydrogen, methyl, chlorine and bromine, and the hydrogen atoms attached to the two carbon atoms at the ring junction are in cis relationship to each other.

2. 1-p-tolylsulfonyl-3-(cis-trans-2decalyl)urea.
3. 1-p-tolylsulfonyl-3-(cis-{cis+trans}-2-decalyl)urea.
4. 1-p-chlorophenylsulfonyl - 3 - (cis-trans-2-decalyl)-urea.
5. 1-phenylsulfonyl-3-(cis-trans-2-decalyl)urea.
6. Racemic 1 - p - tolylsulfonyl-3-(cis-trans-2-decalyl)-urea.
7. Levorotatory 1 - p - tolylsulfonyl - 3 - (cis - trans-2-decalyl)-urea.
8. Dextrorotatory 1 - p - tolylsulfonyl - 3-(cis - trans-2-decalyl)urea.

References Cited in the file of this patent
FOREIGN PATENTS

| | | |
|---|---|---|
| 217,534 | Australia | Feb. 28, 1957 |
| 802,885 | Great Britain | Oct. 15, 1958 |